United States Patent [19]

Zavelovich et al.

[11] Patent Number: 4,604,274

[45] Date of Patent: Aug. 5, 1986

[54] PHOTOCHEMICAL PROCESS FOR THE PREPARATION OF DISILANE

[75] Inventors: Joshua Zavelovich, Lincolnwood; David S. Hacker, Evanston, both of Ill.

[73] Assignee: Amoco Corporation, Chicago, Ill.

[21] Appl. No.: 756,188

[22] Filed: Jul. 18, 1985

[51] Int. Cl.$^4$ .................. C01B 33/04; B01J 1/10; B01K 1/00
[52] U.S. Cl. .................. 204/157.41; 204/157.45; 423/347
[58] Field of Search .................. 423/347; 204/157.1 R

[56] References Cited

U.S. PATENT DOCUMENTS 4,012,301  3/1977  Rich et al. .................. 204/162 R

OTHER PUBLICATIONS

Journal of the American Chemical Society, vol. 103, 11/18/81, Infrared Multiphoton Decomposition of Monosilane, Longeway et al.

*Primary Examiner*—John Doll
*Assistant Examiner*—Lori S. Freeman
*Attorney, Agent, or Firm*—Richard A. Kretchmer; William T. McClain; William H. Magidson

[57] ABSTRACT

Silane is efficiently converted to disilane by irradiation at pressures in excess of about 75 torr using pulsed coherent light having a wavelength in the range from about 10.2 to about 11.2 $\mu$m.

20 Claims, 2 Drawing Figures

PHOTOCHEMICAL PROCESS FOR THE PREPARATION OF DISILANE

BACKGROUND OF THE INVENTION

1. Field of the Invention.

This invention relates to a photochemical process for the preparation of disilane ($Si_2H_6$) from silane ($SiH_4$). More particularly, it relates to the use of coherent light having a wavelength in the range from about 10.2 to about 11.2 μm to induce the conversion of silane to disilane.

2. Description of the Prior Art.

Amorphous silicon films are conveniently prepared by chemical vapor deposition using either silane or disilane as a starting material. For example, amorphous silicon films can be prepared by the plasma decomposition, thermal decomposition, or photochemical decomposition of either silane or disilane. However, disilane is generally much preferred over silane as a starting material for silicon film formation. The rate of film formation obtained by the plasma or thermal decomposition of disilane is much greater than that obtained by the plasma or thermal decomposition of silane. Further, disilane is more useful than silane in photochemical processes for the preparation of silicon films since it is photochemically decomposed by light of longer wavelength which can be produced by readily available light sources such as excimer lasers and mercury lamps.

Amorphous silicon films produced by the chemical vapor deposition of disilane typically contain from about 3 to about 30 atom percent of hydrogen. Accordingly, the resulting material is often referred to as a hydrogenated amorphous silicon or an amorphous silicon-hydrogen alloy. The hydrogen results in valency saturation within the amorphous silicon, which is of importance for satisfactory electronic and photoelectric properties because free valencies can capture charge carriers within the material. This hydrogenated amorphous silicon has become an important electronic material which has found use in a variety of applications such as xerography and the fabrication of solar cells and thin-film, field-effect transistors.

A number of methods are available for the synthesis of disilane. For example, this material can be prepared by: (1) the electric discharge decomposition of silane; (2) the reduction of $SiCl_4$ with metal hydrides such as $LiAlH_4$; and (3) reaction of silicides of magnesium, aluminum, lithium, iron, and other metals with acids or their ammonium salts. Unfortunately, conventional synthetic methods typically result in either a low yield of disilane or a disilane product contaminated by impurities which are difficult to remove and which render the material unsatisfactory for use in the preparation of silicon films for electronic applications.

The $SF_4$-sensitized photochemical decomposition of silane has been described in detail by Longeway et al., *J. Phys. Chem.*, Vol. 87, 354 (1983). Using unfocused radiation having a wavelength of 9.6 μm from a pulsed $CO_2$ laser, these authors studied this decomposition reaction at a fluence of 0.31 J/(cm² pulse) over a pressure range from 3 to 16 torr, and they report that the only volatile products observed were hydrogen and disilane. They report that this finding is unusual since "all other modes of decomposition of $SiH_4$ reported, namely pyrolytic, direct ultraviolet photolysis, direct infrared multiphoton photolysis, $Hg(^3P_1)$ photosensitized decomposition, radiolysis by $CO^{60}$ γ-rays, radiolysis by high-energy electrons, and electric discharge-induced decomposition result in the formation of significant amounts of $Si_3H_8$ and higher silanes of the series $Si_nH_{2n+2}$."

A number of reports dealing with the unsensitized infrared photochemistry of silane have appeared in the scientific literature. For example, Basov et al., *JETP Lett.*, Vol. 14, 165 (1971), reported that at a pressure of 228 torr, infrared radiation from a 50W continuous $CO_2$ laser resulted in the conversion of silane to silicon and hydrogen. These authors did not, however, report the formation of disilane as a photolysis product. In addition, Deutsch, *J. Chem. Phys.*, Vol. 70, 1187 (1979), has described the photolysis of silane at pressures below 92 torr using a pulsed $CO_2$ laser. However, Deutsch expressly states that disilane was not observed as a photolysis product. Similarly, M. Hanabusa et al., *Appl. Phys. Lett.*, Vol. 35, 626 (1979); and Adamova et al., *Khimiya Vysokikh Energii*, Vol. 11, No. 5, 347 (1977) have described the use of radiation from a $CO_2$ laser to initiate the decomposition of silane. However, these authors fail to either suggest or disclose the formation of any silicon-containing products other than silicon itself.

The photolysis of silane by infrared radiation from a pulsed $CO_2$ laser at a wavelength of 10.6 μm over the pressure range from 10 to 22 torr and at a fluence of 1.0 J/(cm² pulse) has been reported in detail by Longeway et al., *J. Amer. Chem. Soc.*, Vol. 103, 6813 (1981). The observed products were $H_2$, $Si_2H_6$, $Si_3H_8$, $Si_4H_{10}$, $Si_5H_{12}$, and a solid $(SiH_x)_n$. At pressures above 14 torr, it is reported that the material balance based on volatile products falls below 80% and solid products become visible in the reaction cell. Further, it is reported that the yield of disilane decreases rapidly as the pressure increases from about 11 to about 20 torr.

Although the photochemical decomposition of silane has been extensively studied, there has been no report in the prior art of any method for the selective conversion of this material to disilane by unsensitized photolysis.

SUMMARY OF THE INVENTION

The present invention is directed to the discovery that silane can be photochemically converted to disilane with near 100% selectivity by irradiation at pressures in excess of about 75 torr using pulsed coherent light having a wavelength in the range from about 10.2 to about 11.2 μm.

One embodiment of the invention is a method for the preparation of disilane which comprises: (a) irradiating silane with pulsed coherent light having a wavelength in the range from about 10.2 to about 11.2 μm and a fluence which is effective to convert at least a portion of said silane to disilane, wherein said irradiation is carried out at a pressure which is in excess of about 75 torr and in the absence of a sensitizer; and (b) separating disilane from the product of (a).

Another embodiment of the invention is a method for the preparation of disilane which comprises: (a) introducing silane into a reaction vessel and irradiating at least a portion of said silane with pulsed coherent light having a wavelength in the range from about 10.2 to about 11.2 μm and a fluence in the range from about 0.2 to about 2.0 J/(cm² pulse) wherein said irradiation is carried out at a pressure in excess of about 75 torr and in the absence of a sensitizer; and (b) separating disilane from the product of (a).

An object of this invention is to provide an improved method for the synthesis of disilane.

Another object of this invention is to provide a method for the conversion of silane to disilane without any appreciable by-product formation.

A further object of this invention is to provide a method for the preparation of high purity disilane which is suitable for use as a starting material in the preparation of silicon films for electronic applications.

A still further object of this invention is to provide a photochemical method for the conversion of silane to disilane which does not involve the use of a sensitizer.

DETAILED DESCRIPTION OF THE INVENTION

Figure 1:
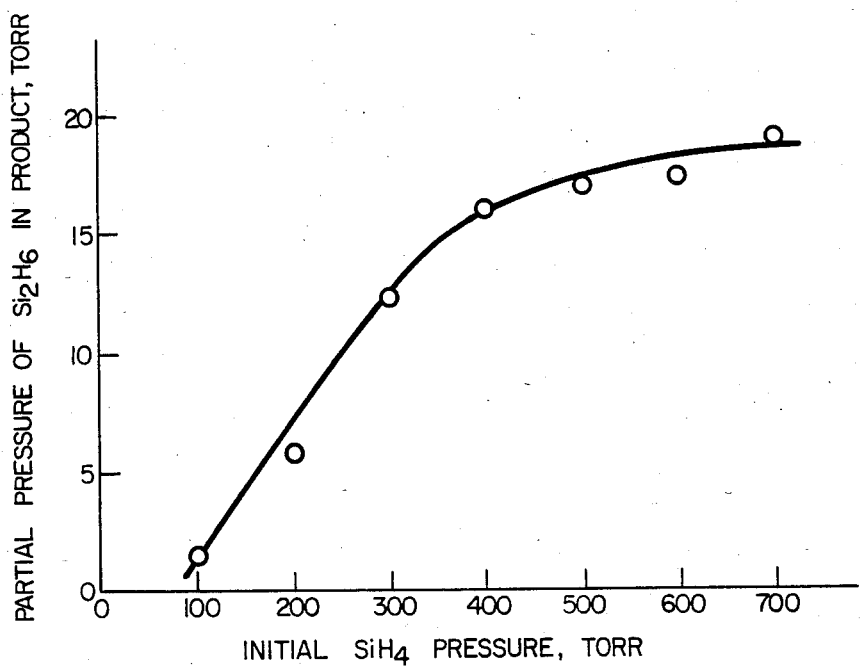
FIG. 1 illustrates the pressure dependence of disilane formation when silane is irradiated with light having a wavelength of 10.6 $\mu$m.

We have found that silane can be photochemically converted to disilane in the absence of a sensitizer and without any appreciable by-product formation through the use of certain critical process parameters. More specifically, we have found that silane can be efficiently converted to disilane by irradiation at a pressure in excess of about 75 torr with pulsed coherent light having a wavelength in the range from about 10.2 to about 11.2 $\mu$m.

The coherent light employed in the practice of this invention must be pulsed and, preferably, the pulse duration is less than about 10 microseconds. However, the pulse repetition rate is not critical and can vary widely, for example, from about 1 Hz or less to greater than about 10,000 Hz. A preferred pulse repetition rate is from about 1 to about 10 Hz. Although the invention is not to be so limited, it is believed that the use of pulsed radiation permits relaxation of the vibrationally excited disilane product and thereby prevents the conversion of this material to undesired by-products.

In addition to being pulsed, the coherent light employed in the practice of this invention must have a fluence which is effective to convert at least a portion of the silane starting material to disilane. Preferably, the fluence is in the range from about 0.2 to about 2.0 J/(cm$^2$ pulse).

Any source of coherent light can be used in the practice of this invention which produces coherent light having a wavelength in the range from about 10.2 to about 11.2 $\mu$m. Light within this wavelength range is absorbed by silane and results in vibrational excitation of the silane. A wavelength of about 10.6 $\mu$m is usually preferred, however.

A carbon dioxide laser is a highly preferred source of coherent light for use in the practice of this invention. This type of laser typically utilizes a gas mixture of carbon dioxide, nitrogen, and helium, and its operation involves excitation of the nitrogen molecules with an electrical discharge followed by resonant energy transfer to a vibrational level of the carbon dioxide molecule. Laser action ordinarily occurs at 10.6 $\mu$m since this is the highest gain transition available. If desired, however, the output of a carbon dioxide laser can be tuned over a wavelength range from about 9.3 to about 11.0 $\mu$m through the use of a wavelength selective element, such as a grating, within the laser cavity. A carbon dioxide TEA (transversely excited, atmospheric pressure) laser is particularly suitable for use in the subject invention since it is inherently a pulsed laser with pulse durations below about 10 microseconds.

A critical requirement of the invention is that the silane irradiation be carried out at a pressure in excess of about 75 torr. Preferably, the pressure is in excess of about 100 torr, and more preferably in excess of about 300 torr. Although the invention is not to be so limited, it is believed that irradiation at relatively high pressures is necessary because vibrationally excited molecules of disilane product are rapidly quenched at relatively high pressures by energy transfer to unexcited gas molecules. It is believed that this rapid quenching serves to prevent the vibrationally excited disilane from undergoing further reactions to yield high molecular weight products.

If desired, the silane starting material can be mixed with one or more substantially inert diluent gases which include, but are not limited to, helium, neon, argon, krypton, xenon and nitrogen. However, any such diluent should desirably have physical properties which permit easy separation from the disilane product. In addition, any diluent utilized should be selected in such a manner that residual amounts of this material will not render the disilane product unsuitable for its intended use, such as use as a starting material in the preparation of silicon films for electronic applications. The combined partial pressures of the silane starting material and any diluent gases must, of course, be in excess of about 75 torr. The amount of diluent gas combined with the silane starting material is not critical and can be varied over a wide range. However, a silane partial pressure greater than about 10 torr is generally desirable.

The temperature at which the silane starting material is irradiated is not critical. However, the temperature should be below about 375° C. since thermal decomposition of silane begins to take place at this temperature. Temperatures below about 300° C. are desirable, but a temperature below about 200° C. is preferred and a temperature in the range from about 0° C. to about 50° C. is highly preferred.

In the practice of the subject invention, the disilane product is separated from unreacted silane, any diluent gases, and by-products by conventional techniques which include, but are not limited to, fractionation based on vapor pressure. However, the silane is converted to disilane with great selectivity and, indeed, we have not observed the formation of any volatile silicon-containing products other than disilane. Accordingly, separation of the disilane product typically involves nothing more than the separation of this material from trace amounts of solid by-products, unconverted silane, and any diluent that may have been used. Since disilane has a boiling point of −14.5° C. as compared to a boiling point of −111.8° C. for silane, these materials can be easily separated by fractional distillation or selective condensation.

A preferred embodiment of the invention comprises terminating the irradiation of silane starting material after partial conversion to products followed by separation of unconverted silane and recycle of this recovered silane for further irradiation and conversion to disilane. For example, after conversion of about 5 or 10% of the silane starting material to products, the components of the reaction mixture can be separated, and unconverted silane can be recycled for further irradiation. This type of operation is conveniently carried out on a continuous basis with fresh starting material continuously flowing into a reaction vessel where the irradiation is effected. An effluent stream is continuously removed from the reaction vessel, and unconverted silane is recovered from this effluent stream and recycled to the reaction vessel. Although the invention is not to be so limited, it is believed that this type of operation serves to maximize the formation of disilane and minimize the formation of by-products.

The photodecomposition of silane in accordance with this invention is believed to involve the initial formation of silene ($SiH_2$) through a multiple photon absorption process according to equation 1. The silene then combines with a molecule of silane to afford a vibrationally excited molecule of disilane ($Si_2H_6^*$). If the $$SiH_4 + nh\nu \rightarrow SiH_2 + H_2 \quad (1)$$

$$SiH_2 + SiH_4 \rightarrow Si_2H_6^* \quad (2)$$

$$Si_2H_6^* \rightarrow SiH_2 + SiH_4 \quad (3)$$

$$Si_2H_6^* + M \rightarrow Si_2H_6 + M \quad (4)$$

$$Si_2H_6^* \rightarrow SiH_3SiH + H_2 \quad (5)$$

$$SiH_3SiH + SiH_4 \rightarrow Si_3H_8^* \quad (6)$$

$$Si_3H_8^* \rightarrow SiH_3SiH_2SiH + H_2 \quad (7)$$

$$SiH_3SiH_2SiH + SiH_4 \rightarrow Si_4H_{10}^* \quad (8)$$

$$Si_4H_{10}^* + M \rightarrow Si_4H_{10} + M \quad (9)$$

$Si_2H_6^*$ is formed by insertion of $SiH_2$ into a vibrationally unexcited $SiH_4$ molecule, the resulting $Si_2H_6^*$ product will have an excess internal energy of about 49 kcal/mole. This internal energy is such that the $Si_2H_6^*$ can either revert to starting materials according to equation 3 or become a stable species through energy transfer to other molecules according to equation 4. Decomposition according to equation 5 can not take place since this pathway has an activation energy of about 56 kcal/mole. However, if the $Si_2H_6^*$ is formed by insertion of $SiH_2$ into a vibrationally excited $SiH_4$ molecule having an excess vibrational energy of 7 kcal/mole or more, the resulting $Si_2H_6^*$ product will have an excess energy of at least 56 kcal/mole, and decomposition according to equation 5 becomes possible. Subsequent reactions, such as those set forth in equations 6-9, can ultimately yield polymeric products such as $SiH_3(SiH_2)_nSiH_3$.

Although the present invention is not to be so limited, it is believed that our method for the synthesis of disilane is successful because: (a) the background vibrational excitation of the $SiH_4$ starting material is minimized; and (b) provision is made for rapid quenching of vibrationally excited species in the reaction mixture. The background vibrational excitation of the starting material is minimized through control of the laser fluence and through use of a pulsed source of coherent light. Rapid quenching of vibrationally excited species is achieved through the use of relatively high pressures.

A preferred embodiment of the invention comprises the irradiation of silane which is in physical contact with additional silane which is not irradiated. For example, the silane starting material is desirably contained in a reaction vessel and only a portion of said starting material is irradiated. In this embodiment, it is believed that the nonirradiated gas molecules serve to rapidly quench the vibrationally excited disilane product molecules through intermolecular collisions and associated energy transfer.

The following examples are intended only to illustrate the invention and are not to be construed as imposing limitations on it.

EXAMPLE I

A tubular aluminum photolysis cell having a 3.2-cm diameter, a 10-cm length, and fitted with sodium chloride windows was evacuated and filled with electronic grade silane (Linde Co.) to a pressure of 100 torr. The contents of the cell were then irradiated with infrared radiation having a wavelength of 944.19 cm$^{-1}$ (10.59μm) from a pulsed TEA Tachisto 215G carbon dioxide laser. The output of the laser was multimode with an energy of 1.18 J/pulse. After 200 pulses at a 1-Hz repetition rate, the gas contained in the photolysis cell was analyzed by gas chromatography. Silane and disilane were found to be the only components of the product gas contained within the photolysis cell. A total of 3.5±1 torr of silane starting material had decomposed and 1.45±0.04 torr of disilane had formed. In addition, the formation of solid deposits could be observed in the photolysis cell.

EXAMPLE II

A series of experiments were carried out exactly as described in Example I except that the amount of silane starting material in the photolysis cell was varied over the range from 200 torr to 700 torr. The results are set forth in Table I together with the results from Example I. In addition, the values from Table I for $Si_2H_6$ formed are set forth in FIG. 1 as a function of initial $SiH_4$ pressure. These results demonstrate that disilane formation increases rapidly as the pressure is increased from a threshold value of about 75 torr up to about 400 torr. As the pressure is increased above about 400 torr, disilane formation increases more slowly and appears to approach a plateau.

TABLE I

| Variation of Disilane Yield with Pressure. | | |
|---|---|---|
| Initial $SiH_4$ Pressure, torr | $Si_2H_6$ Formed$^a$, torr | $SiH_4$ Decomposed, torr |
| 100 | 1.45 | 3.5 ± 1 |
| 200 | 5.8 | 22 ± 1 |
| 300 | 12.9 | 46 ± 2 |
| 400 | 16.0 | 50 ± 3 |
| 500 | 17.0 | 42 ± 4 |
| 600 | 17.4 | 42 ± 6 |
| 700 | 19.1 | 53 ± 7 |

$^a$The error associated with each of these values is about ± 3%.

EXAMPLE III

The procedure set forth in Example I was repeated except that the laser was operated in the TEM$_{oo}$ mode with a beam diameter of 1.2 cm, a fluence of 0.30

J/(cm² pulse), and a pulse repetition rate of 2 Hz. After 1000 pulses, a total of 10.9 torr of silane starting material had decomposed and 5.4 torr of disilane had formed. This represents a disilane yield of 99% based on decomposed silane.

EXAMPLE IV

A series of experiments was carried out as described in Example I except that the fluence of the laser was varied over the range from 191 mJ/(cm² pulse) to 314 mJ/(cm² pulse), and the laser was operated in the TEM$_{oo}$ mode with a beam diameter of 1.2 cm and a pulse repetition rate of 2 Hz for a total of 300 pulses. The energy of the laser beam was controlled by insertion of one or more calcium fluoride windows of appropriate thickness into the beam to provide the desired attenuation. The results are set forth in Table II.

TABLE II

| Variation of Disilane Yield with Laser Fluence. | | |
|---|---|---|
| Fluence, mJ/(cm² pulse) | $Si_2H_6$ Formed, torr | $SiH_4$ Decomposed, torr |
| 191 | 0.23 ± 0.01 | 3 ± 1 |
| 225 | 0.93 ± 0.03 | 4 ± 1 |
| 314 | 2.46 ± 0.07 | 5 ± 1 |

These results demonstrate that the yield of disilane is highly dependent on laser fluence over the range from about 191 to about 314 mJ/(cm² pulse). More specifically, the yield of disilane (based on decomposed starting material) rose from 15% at 191 mJ/(cm² pulse) to 98% at 314 mJ/(cm² pulse).

EXAMPLE V

Figure 2:
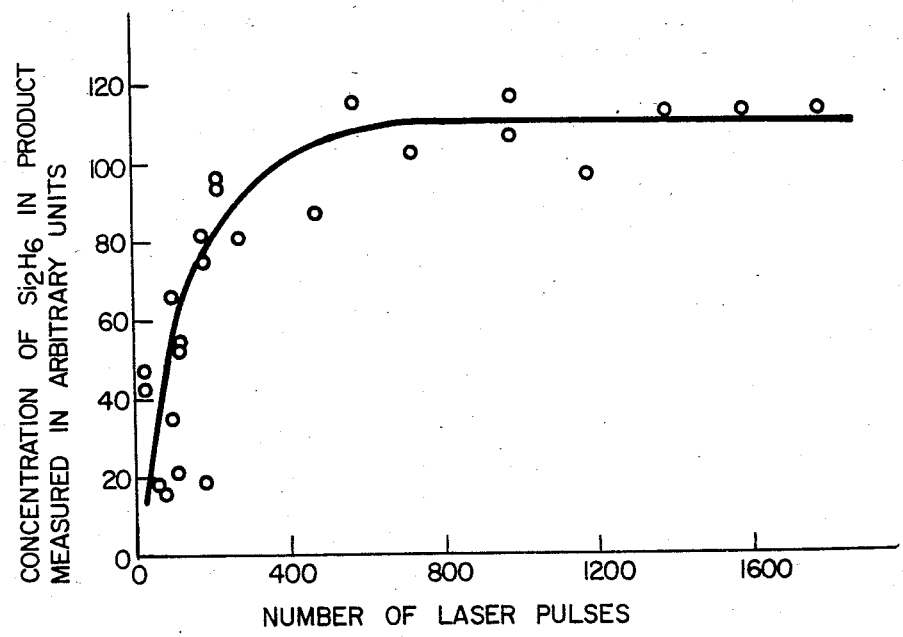
FIG. 2 illustrates the yield of disilane as a function of photolysis time (the number of laser pulses) when silane is irradiated with light having a wavelength of 10.6 $\mu$m.

A series of experiments was carried out as described in Example I except that the number of pulses was varied over the range from about 25 to about 1800, and the laser was operated with a pulse energy of 0.9 J and a repetition rate of 2 Hz. The results are set forth in FIG. 2. The concentration is expressed in arbitrary units taken directly from the gas chromatography unit. FIG. 2 demonstrates that the yield of disilane initially rises very rapidly as the number of pulses (photolysis time) increases. However, a plateau is reached after about 600 pulses and no significant increase in yield is observed upon further increase in the number of pulses. Although the invention is not to be so limited, it is believed that this plateau may be the result of silene insertion into a silicon-hydrogen bond of disilane to yield a vibrationally excited molecule of trisilane ($Si_3H_8$*) according to equation 10. It is believed that this

$$SiH_2 + Si_2H_6 \rightarrow Si_3H_8^* \qquad (10)$$

reaction begins to compete with the reaction set forth above in equation 2 as the disilane concentration increases. Accordingly, a preferred embodiment of the invention involves terminating the irradiation of silane starting material after partial conversion to products followed by separation of unconverted silane from disilane product and recycle of the recovered silane for further irradiation.

We claim:

1. A method for the preparation of disilane which comprises:
 (a) irradiating silane with pulsed coherent light having a wavelength in the range from about 10.2 to about 11.2 μm and a fluence which is effective to convert at least a portion of said silane to disilane, wherein said irradiation is carried out at a pressure which is in excess of about 75 torr and in the absence of a sensitizer; and
 (b) separating disilane from the product of (a).

2. The method as set forth in claim 1 wherein the fluence of said coherent light is in the range from about 0.2 to about 2.0 J/(cm² pulse).

3. The method as set forth in claim 1 wherein the wavelength of said coherent light is about 10.6 μm.

4. The method as set forth in claim 3 wherein the pulse duration is less than about 10 microseconds.

5. The method as set forth in claim 4 wherein the pulse repetition rate is from about 1 Hz to about 10 Hz.

6. The method as set forth in claim 5 wherein the pressure is in excess of about 300 torr.

7. The method as set forth in claim 1 wherein said irradiated silane is in physical contact with additional silane which is not irradiated.

8. The method as set forth in claim 7 wherein silane starting material is contained in a reaction vessel and only a portion of said starting material is irradiated 9. The method as set forth in claim 1 wherein said coherent light is produced by a carbon dioxide laser.

10. The method as set forth in claim 1 wherein said silane is irradiated at a temperature which is below about 200° C.

11. The method as set forth in claim 1 wherein said silane additionally comprises a substantially inert diluent.

12. The method as set forth in claim 11 wherein the partial pressure of silane is greater than about 10 torr.

13. The method as set forth in claim 1 wherein the irradiation is terminated after partial conversion of said silane to products.

14. The method as set forth in claim 1 wherein the irradiation is terminated after partial conversion of said silane to products; unconverted silane is separated from the product of (a); and said unconverted silane is recycled for further conversion to disilane by steps (a) and (b).

15. A method for the preparation of disilane which comprises:
 (a) introducing silane into a reaction vessel and irradiating at least a portion of said silane with pulsed coherent light having a wavelength in the range from about 10.2 to about 11.2 μm and a fluence in the range from about 0.2 to about 2.0 J/cm² wherein said irradiation is carried out at a pressure in excess of about 75 torr and in the absence of a sensitizer; and
 (b) separating disilane from the product of (a).

16. The method as set forth in claim 15 wherein said coherent light is produced by a carbon dioxide laser.

17. The method as set forth in claim 16 wherein the wavelength of said coherent light is about 10.6 μm.

18. The method as set forth in claim 15 wherein said pressure is in excess of about 300 torr.

19. The method as set forth in claim 15 wherein said silane is irradiated at a temperature which is below about 200° C.

20. The method as set forth in claim 15 wherein the irradiation is terminated after partial conversion of said silane to products; unconverted silane is separated from the product of (a); and said unconverted silane is recycled for further conversion to disilane by steps (a) and (b).

* * * * *

UNITED STATES PATENT OFFICE
CERTIFICATE OF CORRECTION

Patent No. 4,604,274    Dated  August 5, 1986

Inventor(s)  Joshua Zavelovich and David S. Hacker

It is certified that error appears in the above-identified patent and that said Letters Patent are hereby corrected as shown below:

Column 8, line 47, "$J/cm^2$" should read --$J/(cm^2 \text{ pulse})$--.

Signed and Sealed this

Tenth Day of March, 1987

*Attest:*

DONALD J. QUIGG

*Attesting Officer*    *Commissioner of Patents and Trademarks*